Sept. 20, 1938.  E. WANAMAKER  2,130,606

AIR CONDITIONING

Filed Oct. 31, 1936  2 Sheets-Sheet 1

Inventor,
Ernest Wanamaker,
Witness:
Chas. R. Koursh  Dyrenforth, Lee, Chritton and Wiles, Attys

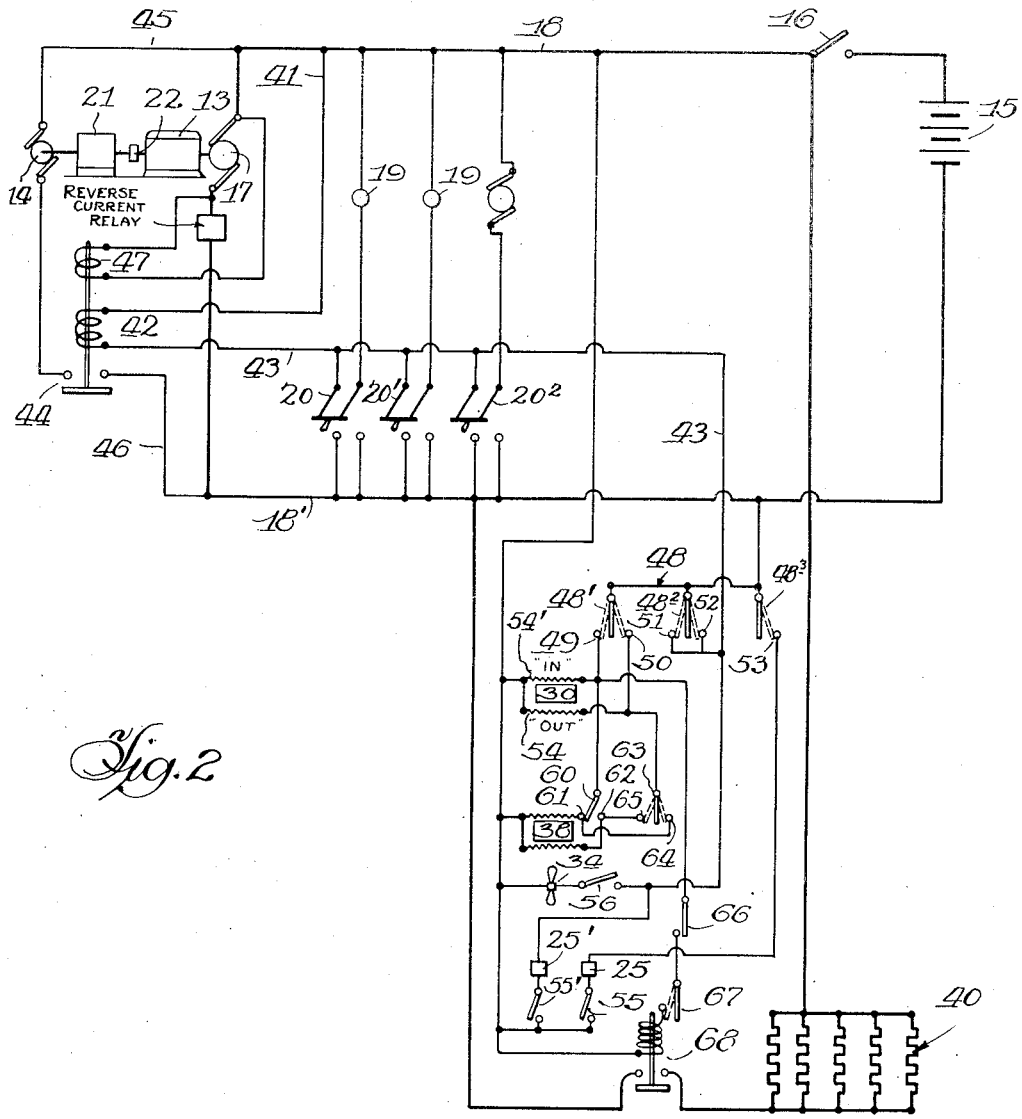

Patented Sept. 20, 1938

2,130,606

UNITED STATES PATENT OFFICE 2,130,606

AIR CONDITIONING

Ernest Wanamaker, Chicago, Ill.

Application October 31, 1936, Serial No. 108,666

7 Claims. (Cl. 257—3)

This invention relates to improvements in systems for supplying a heating medium, a cooling medium, light and other power, and particularly to the automatic operation of such systems, including automatic regulation and control of temperature, humidity, and air washing to remove dirt and odors. Such systems are adapted for any kind of building or structure, boat, railway car or other vehicle, and utilize preferably the energy contained in the fuel of a Diesel engine or other internal combustion engine.

The system is similar in many respects to that disclosed in my copending application Serial No. 91,733, filed July 21, 1936, now Patent No. 2,106,515, issued Jan. 25, 1938, but with added automatic features, whereby the heat of the internal combustion engine may be utilized most efficiently whenever power or the exhaust heat of said engine is required for various uses, singly or in combination. In said earlier patent application, the invention is illustrated as an installation for a railway car, whereas in the present application said invention is illustrated by its adaptation to a building, involving certain apparatus and equipment which necessarily differs in this respect also from what was disclosed previously.

In the present drawings, directed to a building structure such as a house, the medium for heating or cooling the rooms is air which is heated or cooled from the basement, the circulation being aided by a fan or blower. The heat exchanger, which takes the place of the usual furnace, has two sets of coils in it, one of which is connected with the exhaust of a Diesel engine to supply heat to the building. The other set of coils is connected to a mechanical refrigerating unit, including a compressor, driven by said Diesel engine. The refrigerating unit has additional pipes extending to an additional coil in a mechanical refrigerator such as would be located in or near the kitchen or elsewhere for the preservation of perishables, the chilling of water or the cooling of milk, as for example on a farm or where dairy equipment is connected to the cooling unit as an auxiliary installation. Suitable magnetic valves are provided controlled by thermostats whereby said mechanical refrigerator may be operated independently of the cooling coils of the heat exchanger in the basement. In other words, either or both may be in operation at one and the same time, depending on the temperature conditions in the house. When the exhaust heat of the engine is not required to heat the house, as in warm weather, for example, the exhaust gases are by-passed to a stack by means of a magnetically operated valve also controlled automatically by a thermostat or thermostats.

The blower draws the air from the various rooms downwardly and recirculates it through the heat exchanger when the house is being heated and also when it is being cooled. A fresh air inlet permits said fan to draw in a certain proportion of outside air and mix it with the air that is being recirculated. When the heating system begins to operate the outside air is automatically shut off by a suitable automatically controlled damper to permit the rooms to be heated more quickly by recirculating the air through the heat exchanger. After a predetermined temperature has been attained, the damper may automatically open to permit the desired proportion of fresh air to be combined with the recirculated air within the house. In like manner in cooling the house initially the outside air (which is warmer than the desired temperature) is shut off and the air within the house is recirculated to air condition it, i. e. to cool it, to wash and filter it and to regulate its humidity. A small amount of outside air may, at a later period, be admitted automatically and combined with the recirculated air if desired.

As in the earlier described system, the engine drives a generator which supplies current to the lighting circuit in the house, to the battery which is used to start the engine, and for the operation of motors for driving washing machines, vacuum cleaners, pumps for supplying water and for humidity control sprays, or for any other purpose where electric power is required within or without the house. To heat the house quickly, electric heating units may be installed to supplement the heat furnished by the exhaust of the engine and these electric heaters may also constitute the sole heating means under conditions where only a small amount of heat is required. The internal combustion engine may be water cooled, air cooled or otherwise cooled, the refrigerating unit being available for this purpose also.

The system is so designed that after closing the main switch, said system is conditioned for automatic operation to supply whatever heating, cooling, lighting or power may be called for. For example, turning on any one of the lights or closing a motor or heater circuit will automatically close the starting circuit causing the generator to operate. If light is not called for but the rooms are too cool or too warm, the necessary thermostats or controls automatically cause the engine to start, thereby supplying the heating or cooling medium which brings the rooms to the desired temperature and maintains said temperature within the desired limits. The system operates in such a manner as to utilize the heating or cooling most effectively, i. e. cold air is not drawn into the system when the rooms require prompt heating nor is warm hair drawn in from outside when the rooms require prompt cooling.

From the foregoing it will be seen that the general object of the invention is to utilize the heat and power of an internal combustion engine with the utmost efficiency, in a system of this character.

Contributory objects include the provision of a master thermostat and control and other thermostats and controls, electrically operated fans and pumps, valves and other devices so connected to and correlated with the heavier mechanical equipment as to carry out the necessary functions of the apparatus in a simple and effective manner.

In the drawings:

Fig. 2 is a circuit diagram with most of the circuits open as when the equipment is not operating;

Fig. 3 is a part of the same diagram showing certain local circuits closed as when heat is called for;

Fig. 4 is a similar diagram showing certain circuits closed when cooling is called for.

Figure 1:
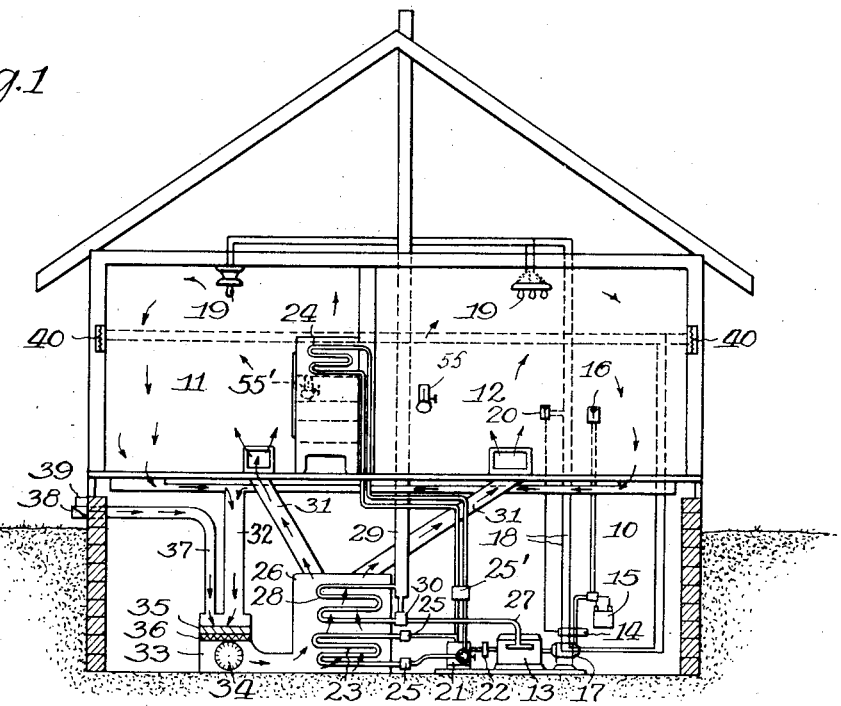
Fig. 1 is a section through a house, shown somewhat diagrammatically, disclosing in simplified form one type of installation.

In the drawings the building or house is shown in very elementary form and comprises a basement 10 and rooms 11 and 12 on the main floor. The system may be extended to additional rooms, on the main floor, or sub-basements, or on any number of upper floors or to auxiliary building structures outside of the main structure.

The internal combustion engine 13 is shown in the basement. It is preferably a Diesel engine which has the advantage of using a very inexpensive grade of fuel. Such fuel may be piped to the house as from a central supply station and metered in the same manner that water and gas are supplied in towns and cities from a central plant to individual buildings. The engine is equipped with a suitable starter 14, preferably an electric starter, which is supplied by current from any suitable source, preferably a storage battery 15. The main switch 16, or duplicates thereof, may be located in any convenient location or locations, as for example in the room 12. On closing this switch the battery is connected to the circuit so that the engine may start, provided other parts of the circuit are closed in the manner hereinafter described, as for example by turning on one of the electric light switches. The engine drives the generator 17. Lighting circuits 18 extend from the generator to the various incandescent lights 19 which are controlled by double pole switches 20, or to motors.

The engine also drives a refrigerating unit 21 through a clutch 22 (which may be electrically controlled to make it effective or ineffective as desired) comprising a compressor and other necessary equipment, said unit being shown in the drawing as directly connected, although it may be driven indirectly from the engine by means of a motor, electrically connected to the generator as in my earlier patent application, previously identified.

Coolings coils 23 are connected to the refrigerating unit as well as additional cooling coils 24, which are shown as part of the conventional mechanical refrigerator located in the room 11. Remote controlled valves 25, 25' admit the refrigerant to one or the other or both of these coils. Coil 23 is located in a suitable housing 26 comprising a heat exchanger unit and located preferably in the basement in place of, or as part of, the usual furnace or heating plant, or it may be located in the combustion chamber of an existing heating plant.

The engine exhaust pipe 27 is connected to a heating coil 28 in the heat exchanger, the exhaust passing up the stack 29 through the roof. A remote controlled valve or heat exchanger by-pass valve 30 is provided whereby when the heat exchanger is used for cooling purposes or when no heat is required, the exhaust may pass out the stack without passing through the coil 28. The heat exchanger housing 26 is connected by flues or ducts 31 with the rooms above whereby the heated or cooled air from said housing may flow into said rooms or elsewhere, through suitable additional ducts, as may be desired. The air from the rooms is drawn downwardly through additional ducts 32 into a fan chamber 33 by means of a fan or blower 34. Said fan is driven by an electric motor (not shown) connected to the generator circuit. An air filter 35, of suitable form, is located preferably in the fan chamber and also a humidifier 36 of any preferred type, whereby the air circulated through the house by the fan is cleaned, washed and regulated as to humidity.

A fresh air duct 37 leads through a wall of the building to a fan chamber and is provided with a damper 38, actuated by an automatic remote control device 39 (or by hand) whereby any desired proportion of fresh air may be mixed with the air being circulated within the building, either during heating or cooling. The ratio of the fresh air to the recirculated air may also be varied by a specially designed blower having a sliding partition such as illustrated in my earlier patent application previously identified.

Auxiliary electric heaters may be installed wherever desired in the building and are shown as resistors 40 mounted in recesses of the outer walls of the two rooms and connected to the generator.

The circuit diagram is shown in Fig. 2 in which the generator 17 is intended to supply current to what may be called the main circuit 18, 18'. As shown, the engine 13 and generator 17 are at rest, certain local circuits are open and the system is not operating. The closing of the master switch 16, which connects the battery 15 to the main circuit, does not result in starting the engine as the starting circuit is open elsewhere. If, however, a light 19 is turned on, or a motor started, by closing one of the two-pole switches 20, 20', 20², which are in parallel, current will then flow from said battery, through the conductor 18, conductor 41, lifting coil 42, conductor 43, through one side of the switch 20, 20' 20², as the case may be, to return conductor 18'. The lifting coil thereupon closes the switch 44, which permits battery current to flow through conductor 18, conductor 45, starting motor 14 and switch 44, through conductor 46 and back through conductor 18'. The starting motor now starts the engine, which operates the generator and the latter furnishes current not only to the lamp 19, but also to a neutralizing coil 47 connected across the generator terminals, thus permitting the starting switch to fall open and disconnect the starting motor from the battery. If, while the incandescent lamp 19 is burning, one of the other switches 20', 20² is closed, a duplicate circuit is made available.

Figure 4:
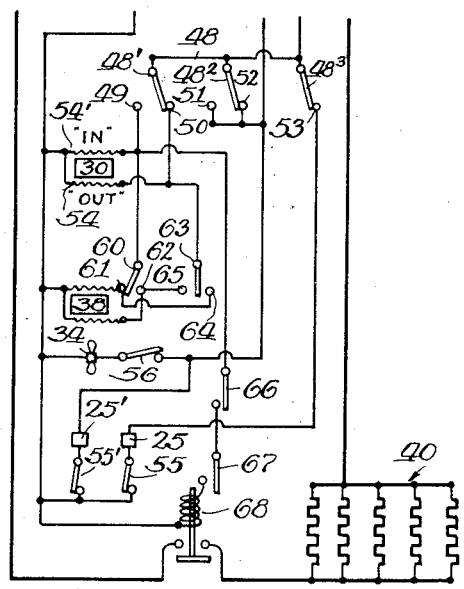

Thus far the master thermostat 48 may be assumed to be open. It is located in any desired part of the house and comprises a plurality of thermostatic elements 48', 48² and 48³, which, for simplicity, are shown in neutral position ready to bend to the left or the right to close the circuit to various fixed contacts 49, 50, 51, 52 and 53. The master thermostats have only slight movement and are either in one extreme position or the other, being controlled preferably by a quick snap action device and associated with a mercoid switch, for example, to close or open the circuits. Said thermostats are in neutral position only when manually placed therein. Contacts 51 and 52 are connected, in parallel, to conductor 43. Assuming the air surrounding the master thermostat becomes too warm, due for example to warm weather outdoors, the three contacts will move to the right. See Fig. 4. The thermostat 48' engages the contact 50 and closes a circuit through the "out" coil 54 which energizes the magnetic by-pass valve 30, previously described. Said valve then operates to by-pass the exhaust from the engine up the stack instead of through the heat exchanger 26 through which it may be assumed to have been passing since the engine started.

The thermostat 48² and contact 52 serve to close the circuit through conductor 43 to the lifting coil 42 and thus duplicate, in effect, the closing of the starting circuit by one of the switches 20. Since at least one light is assumed to be on, the closing of the starting circuit at this time performs no useful function. If no lights were on, but the house was too warm, as stated, the engagement of the middle thermostat 48² with the contact 52 would start the engine, in order to render operative the refrigerating apparatus. It will be noted that the engine starts whether this thermostat moves one way or the other, i. e. whether the house is too warm or too cool.

Thermostat 48³, when it engages contact 53, closes the circuit to the cooling thermostat 55, located in any one of the rooms. There may be several such thermostats, all connected in parallel circuits to the magnetic valve 25. If the cooling thermostat is in the same room as the master thermostat it will presumably close at the same temperature, or, if in some other room it will of course close at the temperature for which it may be set. Any one of these thermostats will close the circuit to the normally closed magnetic valve 25 which opens and permits the refrigerant to flow through the coils 23 or 24, or both, thus cooling the room or rooms in which the thermostats 55 are located.

The supply of refrigerant to the refrigerator 24 may also be regulated automatically by means of another thermostat 55', controlling a duplicate set of valves 25' in the piping leading to the refrigerator so that the refrigerator may be regulated automatically without reference to whether the house is being heated in winter or cooled in summer.

Figure 3:
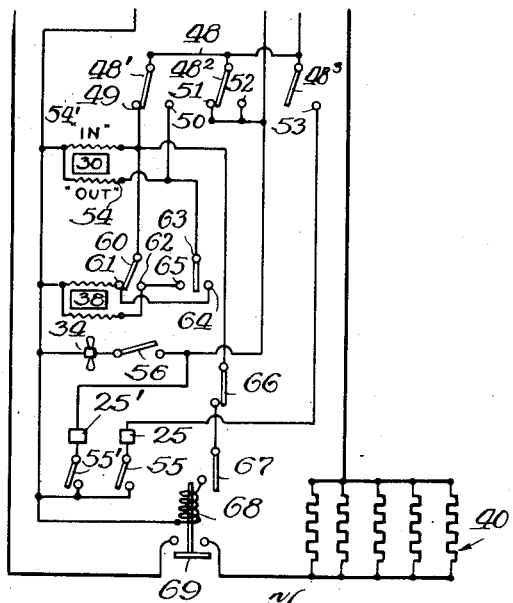

It will be evident that where heat is required to warm the house, the master thermostat operates in the opposite direction from that described in connection with the cooling operation. The position of the thermostats is shown in Fig. 3 for the heating operation. Thermostat 48' engages contact 59 and thus energizes the "in" coil 54' which turns the valve 30 in the opposite direction, permitting the exhaust gases from the engine to flow through the heating coil 28 in the heat exchanger 26, before passing up the stack. Thermostat 48² engages contact 51, and, if the system has previously been at rest, the closing of this circuit starts the engine, as previously explained. If the engine is already running, no further action results. Thermostat 48³ remains open. Hence the valve 25 is in its normal or closed position preventing refrigerant from flowing through the cooling coil 23 in the heat exchanger. If one of the thermostats 55 remains closed because of the fact that some one room is warm enough without additional heat, the magnetic valves 25 remain closed, nevertheless, because the circuit which controls them is open at contact 53.

The circulating fan 34 is in a circuit controlled by the hand switch 56. Said fan is so connected that it can be operated either when the house is being heated or cooled, being connected to the master contact 51, 52, on heating or cooling. It could be operated automatically but conditions under which it is used vary so that the automatic control is not shown. The damper control 38 may be controlled by the additional thermostat 60. When it is desired to cool the house the damper remains closed to permit recirculation of the air which is being cooled artificially. When the desired minimum temperature is reached, the thermostat 60 makes contact at 61 and opens the damper, more or less. This results in including a little fresh air in the circulated air but the refrigerating coils continue to operate and maintain the desired temperature of the circulating air. If the temperature rises above a predetermined setting, thermostat 60 will make contact at 62 and close the damper 38 until the temperature has dropped to a predetermined setting permitting the damper to open.

In winter, and assuming the damper to be closed, the house temperature will increase due to the use of exhaust heat and when the desired temperature is reached, the thermostat 63 closes contact 64 and energizes the coil which opens the damper and allows fresh air to circulate. If the temperature starts to drop despite the heat from the exhaust coil, the thermostat 63 will close contact 65, closing the damper. When the thermostat 60 is in middle position, the damper remains in its last position, but when contact is made at 61 when the room is being heated, for example, and has become warm enough to justify the addition of outside air, the damper opens.

In order to heat up the rooms quickly, the electric heaters 40 may be used, but at this time it would not be desirable to have the damper open. Thus there is provided an electrical interlock 66 according to which, when the damper is in closed position, the mechanically interlocked circuit is closed, and this circuit includes a thermostat 67. When the room is cool, the thermostat is closed, thus permitting current to flow to the electric heaters only if the damper is closed. If the damper is open the circuit is open at that point, regardless of the fact that it is closed at the thermostat. As the room starts to heat up, said thermostat opens upon a small increase in temperature, as it is desired to use electric current sparingly. When this thermostat closes it energizes a coil 68 which closes a switch 69 in the heater circuit, thus connecting the resistance elements 40 to the generator circuit.

Reviewing the operation of the system, if the thermostats call for neither heating nor cooling and no lights are required, the system is at rest. If any one of the light switches or switches for any current consuming device are turned on, the system will automatically be started but without any functioning of the heating or cooling apparatus, due to the fact that the thermostats are calling for neither heating nor cooling, i. e. they are in mid-position.

If no lights are being used and the thermostats call for either heating or cooling, the system will automatically start by the functioning of the master selector thermostat. The circuit through the master thermostat is in parallel with all of the lighting or power circuit switches, that is, the arrangement is such that any demand for electrical energy, either light, heat, power or cooling, will start the system.

It will be noted that refrigerant can be secured during the heating period for the refrigerator. However when the refrigeration is satisfied, the thermostats can be arranged to disconnect the refrigeration compressor from the engine by means of the magnetic clutch 22. The same holds true during the cooling period, if the air conditioning and refrigerating requirements both are satisfied. This would not prevent the operation of the lights by the continued operation of the generator.

The battery in this system is intended primarily for supplying current to start the engine and for the various controlling and regulating devices and not for furnishing current for electric light and power. However, if it is found desirable to use a battery sufficiently large for these other purposes, the same may be employed by providing the usual switches, etc., whereby it may be automatically charged from the main generator. Also, it may be charged in other ways, as for example by a small auxiliary generator driven from the engine shaft through suitable control apparatus of known design.

I claim:

1. In a system for heating and cooling, an internal combustion engine having a starter, an electric generator driven thereby, a refrigerating unit also driven by said engine, a housing containing heating and cooling means connected to the exhaust of said engine and to said unit, a magnetic valve to render said cooling means effective, a second magnetic valve to admit or cut off the discharge of exhaust heat from said engine to said heating means to render the same effective or ineffective, conduits from said housing to the compartment to be regulated to conduct the necessary heating and cooling medium thereto, temperature responsive means in said compartment, an independent source of current, a circuit therefrom in which said temperature responsive means is connected to open the same at a predetermined temperature, a master temperature responsive means in said circuit to close the same on the attainment of a predetermined temperature, an engine starting circuit also closed by said master temperature responsive means as the temperature rises, whereby said refrigerating unit is operated by said engine, said first mentioned magnetic valve also being connected in said first mentioned circuit and actuated to cause the cooling of said housing and hence of said compartment.

2. In a system for heating and cooling, an internal combustion engine having a starter, an electric generator driven thereby, a refrigerating unit also driven by said engine, a housing containing heating and cooling means connected to the exhaust of said engine and to said unit, a refrigerator compartment having a cooling coil therein, also connected to said refrigerating unit, magnetic valves to render said cooling means effective or to render said cooling coil effective, or to render both effective, a second magnetic valve to admit or cut off the discharge of exhaust heat from said engine to said heating means to render the same effective or ineffective, conduits from said housing to the compartment to be regulated to conduct the necessary heating and cooling medium thereto, temperature responsive means in said compartment, an independent source of current, a circuit therefrom in which said temperature responsive means is connected to open the same at a predetermined minimum temperature, a master temperature responsive means in said circuit to close the same on the attainment of a predetermined maximum temperature, an engine starting circuit also closed by said master temperature responsive means as the temperature rises, whereby said refrigerating unit is operated by said engine, said first mentioned magnetic valve also being connected in said first mentioned circuit and actuated to cause the cooling of said housing and hence of said compartment.

3. A system as in claim 1 in which master temperature responsive means concurrently closes a circuit to said second magnetic valve to prevent said heating means from becoming effective.

4. A system as in claim 1 with the addition of a fresh air intake to said housing and additional temperature responsive devices for shutting off said fresh air when the cooling system begins to operate.

5. In a system for heating and cooling, an internal combustion engine having a starter, an electric generator driven thereby, a refrigerating unit also driven by said engine, a housing containing heating and cooling means connected to the exhaust of said engine and to said unit, a magnetic valve to render said cooling means effective, a second magnetic valve to admit or cut off the discharge of exhaust heat from said engine to said heating means to render the same effective or ineffective, conduits from said housing to the compartment to be regulated to conduct the necessary heating and cooling medium thereto, an independent source of current, a circuit therefrom, a master temperature responsive means in said circuit to close the same on the attainment of a predetermined minimum temperature and actuate said second magnetic valve to admit exhaust heat to said heating means, and an engine starting circuit also closed by said master temperature responsive means.

6. In a system for heating and cooling, an internal combustion engine having a starter, an electric generator driven thereby, a refrigerating unit also driven by said engine, a housing containing heating and cooling means connected to the exhaust of said engine and to said unit, a magnetic valve to render said cooling means effective, a second magnetic valve to admit or cut off the discharge of exhaust heat from said engine to said heating means to render the same effective or ineffective, conduits from said housing to the compartment to be regulated to conduct the necessary heating and cooling medium thereto, an independent source of current, a circuit therefrom, a master temperature responsive means in said circuit to close the same on the attainment of a predetermined minimum temperature and actuate said second magnetic valve to admit exhaust heat to said heating means, an engine starting circuit also closed by said master temperature responsive means, means for circulating the heated air in said compartment, and means for combining therewith a variable amount of fresh air.

7. A system as in claim 6 with the addition of means for filtering and regulating the humidity of said circulating air.

ERNEST WANAMAKER.